(12) United States Patent
Yetto

(10) Patent No.: US 12,369,561 B1
(45) Date of Patent: Jul. 29, 2025

(54) HIDEAWAY DOG KENNEL

(71) Applicant: Sharon K. Yetto, Oley, PA (US)

(72) Inventor: Sharon K. Yetto, Oley, PA (US)

( * ) Notice: Subject to any disclaimer, the term of this patent is extended or adjusted under 35 U.S.C. 154(b) by 28 days.

(21) Appl. No.: 18/199,935

(22) Filed: May 20, 2023

(51) Int. Cl.
  *A01K 1/03* (2006.01)
(52) U.S. Cl.
  CPC .................................. *A01K 1/034* (2013.01)
(58) Field of Classification Search
  CPC .... A01K 1/034; A01K 1/0005; A01K 1/0011; A01K 1/0029; A01K 1/0035
  USPC ................................................. 119/416, 514
  See application file for complete search history.

(56) References Cited

U.S. PATENT DOCUMENTS

| | | | | |
|---|---|---|---|---|
| 327,305 A * | 9/1885 | Parker | ................. | B60P 3/04 |
| | | | | 15/241 |
| 329,716 A * | 11/1885 | Chamberlin | .......... | B61D 3/163 |
| | | | | 119/412 |
| 340,946 A * | 4/1886 | Grossman | ............. | B61D 3/163 |
| | | | | 119/412 |
| 989,029 A * | 4/1911 | Newcomb | ............. | B65D 25/04 |
| | | | | 217/14 |
| 1,330,404 A * | 2/1920 | Sommer | ................. | A01K 3/001 |
| | | | | 256/25 |
| 2,121,658 A * | 6/1938 | Gehret | .................... | A01K 1/03 |
| | | | | 119/474 |
| 3,204,606 A * | 9/1965 | Parr | ........................ | E04H 17/18 |
| | | | | 16/236 |
| 3,804,065 A * | 4/1974 | Coates | ................. | A01K 1/0272 |
| | | | | 119/412 |
| 4,537,151 A * | 8/1985 | Bolton | .................... | A01K 3/001 |
| | | | | 119/512 |
| 4,819,582 A * | 4/1989 | Lichvar | ................. | A01K 1/034 |
| | | | | 119/474 |
| 5,116,256 A * | 5/1992 | Allen | ..................... | A01K 1/034 |
| | | | | 119/458 |
| 5,195,457 A | 3/1993 | Namanny | | |
| 5,282,606 A * | 2/1994 | Praiss | ....................... | E04H 4/06 |
| | | | | 256/26 |
| 5,826,545 A * | 10/1998 | Steffes | ..................... | A01K 1/03 |
| | | | | 119/473 |
| 6,450,124 B1 * | 9/2002 | Calvert | ................. | A01K 3/001 |
| | | | | 119/512 |
| 6,467,433 B1 * | 10/2002 | Stanton | .................... | B60P 3/04 |
| | | | | 119/512 |
| 6,729,267 B2 * | 5/2004 | Campbell | ................ | B60P 3/04 |
| | | | | 119/519 |

(Continued)

*Primary Examiner* — Monica L Perry
*Assistant Examiner* — Maria E Graber
(74) *Attorney, Agent, or Firm* — Cramer Patent & Design, PLLC.; Aaron R. Cramer

(57) ABSTRACT

The hideaway dog kennel may comprise a dog kennel divider that may be pivotably coupled to a first room wall. The hideaway dog kennel may fold flat against the first room wall in a stored configuration. The hideaway dog kennel may be unfolded to reveal two divider walls of an individual dog kennel. A first divider wall and a second divider wall of the dog kennel divider may comprise a first kennel wall and a second kennel wall of the individual dog kennel. The first room wall may comprise a third kennel wall. A second room wall may comprise a fourth kennel wall. Two or more dog kennel dividers may be installed adjacent to each other to provide a group of dog kennels where the fourth kennel wall may be the second room wall or the first divider wall of an adjacent dog kennel divider.

1 Claim, 4 Drawing Sheets

(56) References Cited

U.S. PATENT DOCUMENTS

| | | | |
|---|---|---|---|
| 7,021,242 B2 * | 4/2006 | Axelrod | A01K 1/0245 119/498 |
| 7,228,820 B1 | 6/2007 | Kellogg et al. | |
| 7,380,521 B2 * | 6/2008 | Morton | A01K 1/0254 119/499 |
| 7,487,744 B1 * | 2/2009 | Goldberg | A01K 31/07 119/482 |
| 7,802,540 B2 * | 9/2010 | Jakubowski | A01K 1/0254 119/497 |
| 7,958,616 B2 * | 6/2011 | Meyer, Jr. | A01K 3/001 119/514 |
| 8,056,512 B2 * | 11/2011 | Craig | G09F 9/40 119/501 |
| 8,438,995 B1 * | 5/2013 | Donahue | A01K 1/00 119/512 |
| 9,485,957 B2 * | 11/2016 | Kellogg | A01K 1/034 |
| 10,582,693 B1 * | 3/2020 | Kazanchyan | A01K 1/0353 |
| 10,842,126 B1 | 11/2020 | Volin | |
| 11,191,251 B1 * | 12/2021 | Aragona | A01K 1/034 |
| 11,638,411 B2 * | 5/2023 | Niemela | B60P 3/04 119/502 |
| 12,071,061 B2 * | 8/2024 | Zanassi | B60P 3/04 |
| 2002/0139315 A1 * | 10/2002 | Calvert | A01K 3/001 119/512 |
| 2003/0209208 A1 * | 11/2003 | Campbell | B60P 3/04 119/513 |
| 2004/0134444 A1 | 7/2004 | Shiever et al. | |
| 2008/0236502 A1 * | 10/2008 | Elias | A01K 1/0209 119/840 |
| 2009/0031964 A1 | 2/2009 | Proxmire | |
| 2010/0281788 A1 | 11/2010 | Thomas | |
| 2012/0210947 A1 * | 8/2012 | DiPaolo | A01K 15/02 119/472 |
| 2013/0068171 A1 * | 3/2013 | Lee | A47F 5/0838 119/416 |
| 2016/0113229 A1 * | 4/2016 | Porter | A01K 1/0029 119/840 |
| 2016/0057969 A1 | 11/2016 | Kellogg | |
| 2018/0020634 A1 * | 1/2018 | Mazzilli | A01K 1/10 119/512 |
| 2021/0392849 A1 | 12/2021 | Stier | |
| 2023/0389511 A1 * | 12/2023 | Hampel | A01K 1/0088 |

* cited by examiner

HIDEAWAY DOG KENNEL

RELATED APPLICATIONS

None.

FIELD OF THE INVENTION

The present invention relates generally to a dog kennel and more specifically to a dog kennel capable of being stored away in an unobtrusive manner.

BACKGROUND OF THE INVENTION

Dog kennels are commonly found in homes with dogs as pets. They provide a safe location for the dog when being allowed to run free is not a safe option. Kennels are also found in other types of business such as doggy day care centers, groomers, veterinarians, and breeders, often to help secure a much larger quantity of dogs.

As one can imagine, such a large quantity of kennels can occupy a large amount of space, especially when not being used. They must be stacked up, removed and restacked when needed. They also require periodic cleaning which is not easy to do. Finally, such a large quantity of empty kennels is not an aesthetically pleasing site to look at when one is trying to keep their business attractive to potential customers. Accordingly, there exists a need for a means by which a large quantity of kennels can be made readily available when needed, but yet only occupy minimal space when not needed. The development of the Hideaway Dog Kennel fulfills this need.

SUMMARY OF THE INVENTION

To achieve the above and other objectives, the present invention provides for a hideaway dog kennel having a dog kennel divider with a wall mount that can be mounted on a first room wall. It includes a first divider wall and a second divider wall, where the first divider wall is wider than the second divider wall. The second divider wall can pivot to a stored configuration behind the first divider wall, which is parallel to the first room wall. The kennel can also be opened for the dog to enter or exit by pivoting both walls counter-clockwise. The kennel has a wall release latch that detaches the first divider wall from the second room wall or adjacent dog kennel divider. Both the first and second divider walls are vertically oriented planar structures that are adapted to constrain movement of one or more dogs.

The second divider wall may have a hinge on one side that connects it to the other side of the same wall and another hinge on the other side that connects it to the second room wall or adjacent dog kennel divider. The first hinges may be on the right side of the first divider wall, while the second hinges are on the right side of the second divider wall. In a closed configuration, the second divider wall may be perpendicular to the first divider wall, enclosing one of the dog kennels in a rectangular area. In the closed configuration, the first divider wall may be the first kennel wall, the second divider wall is the second kennel wall, the first room wall is the third kennel wall, and the second room wall or first divider wall of the adjacent dog kennel divider is the fourth kennel wall. An upper section of the second divider wall may allow visibility and airflow into one of the dog kennels. The upper section may be made of clear plastic. The upper section can be a screen, grill, wire mesh, or a series of apertures. A kennel door latch may be used to retain the second divider wall in the kennel closed configuration by attaching it to the second room wall or adjacent dog kennel divider.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
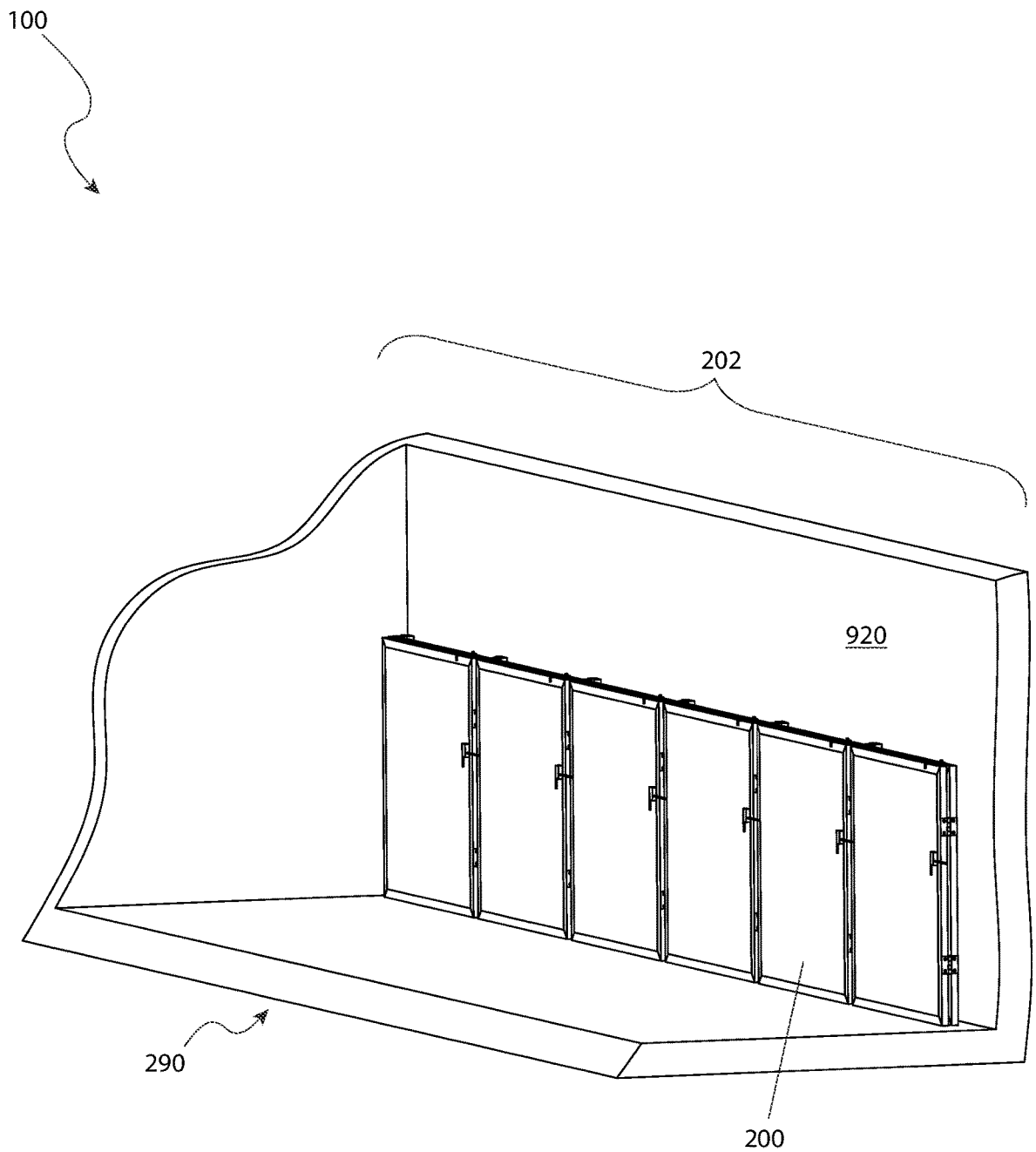
FIG. 1 is an isometric view of a hideaway dog kennel, according to an embodiment of the present invention, illustrating a plurality of dog kennel dividers coupled to the first room wall.
Figure 2:
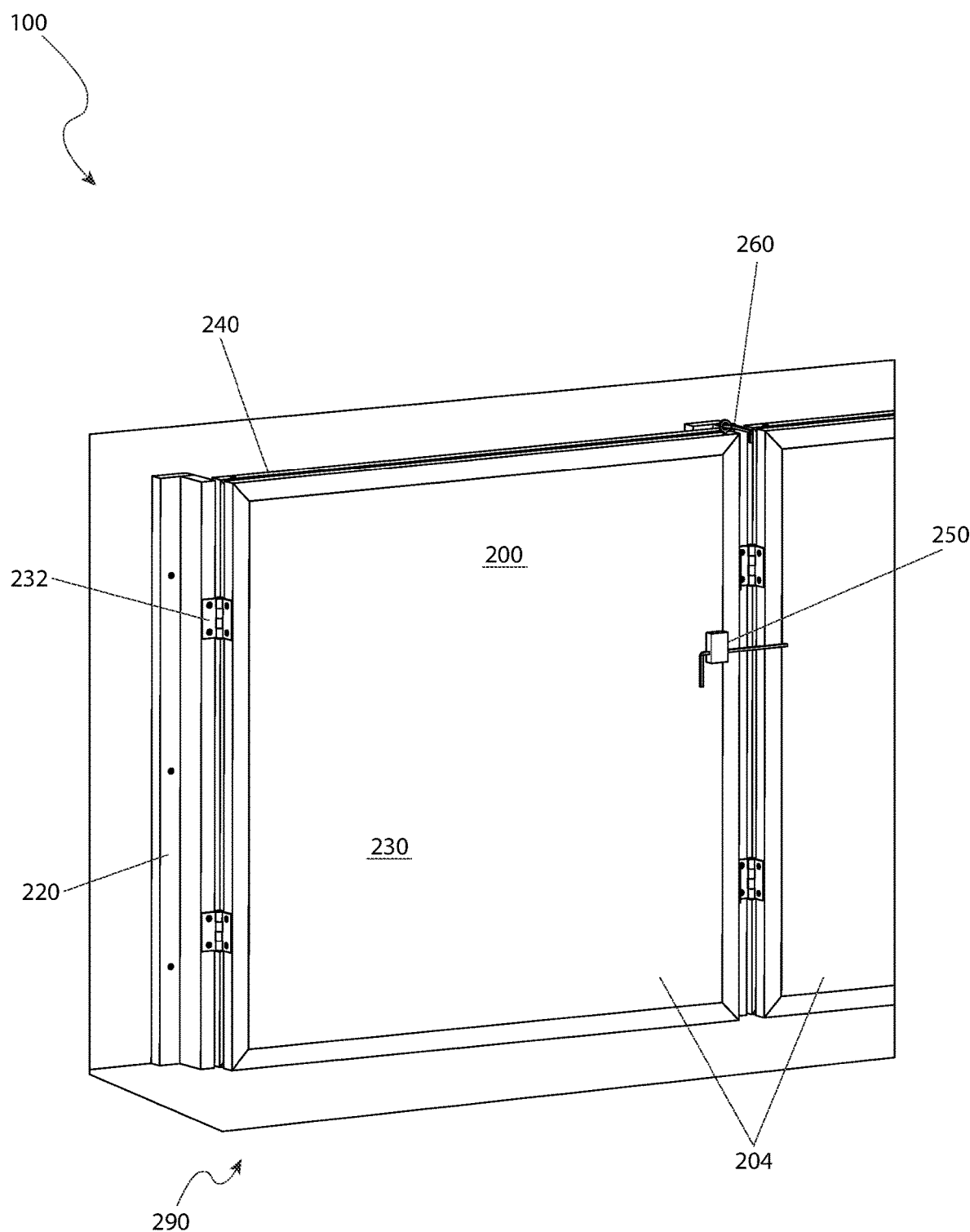
FIG. 2 is an isometric view of a hideaway dog kennel, according to an embodiment of the present invention, illustrating a dog kennel divider in the stored configuration.
Figure 3:
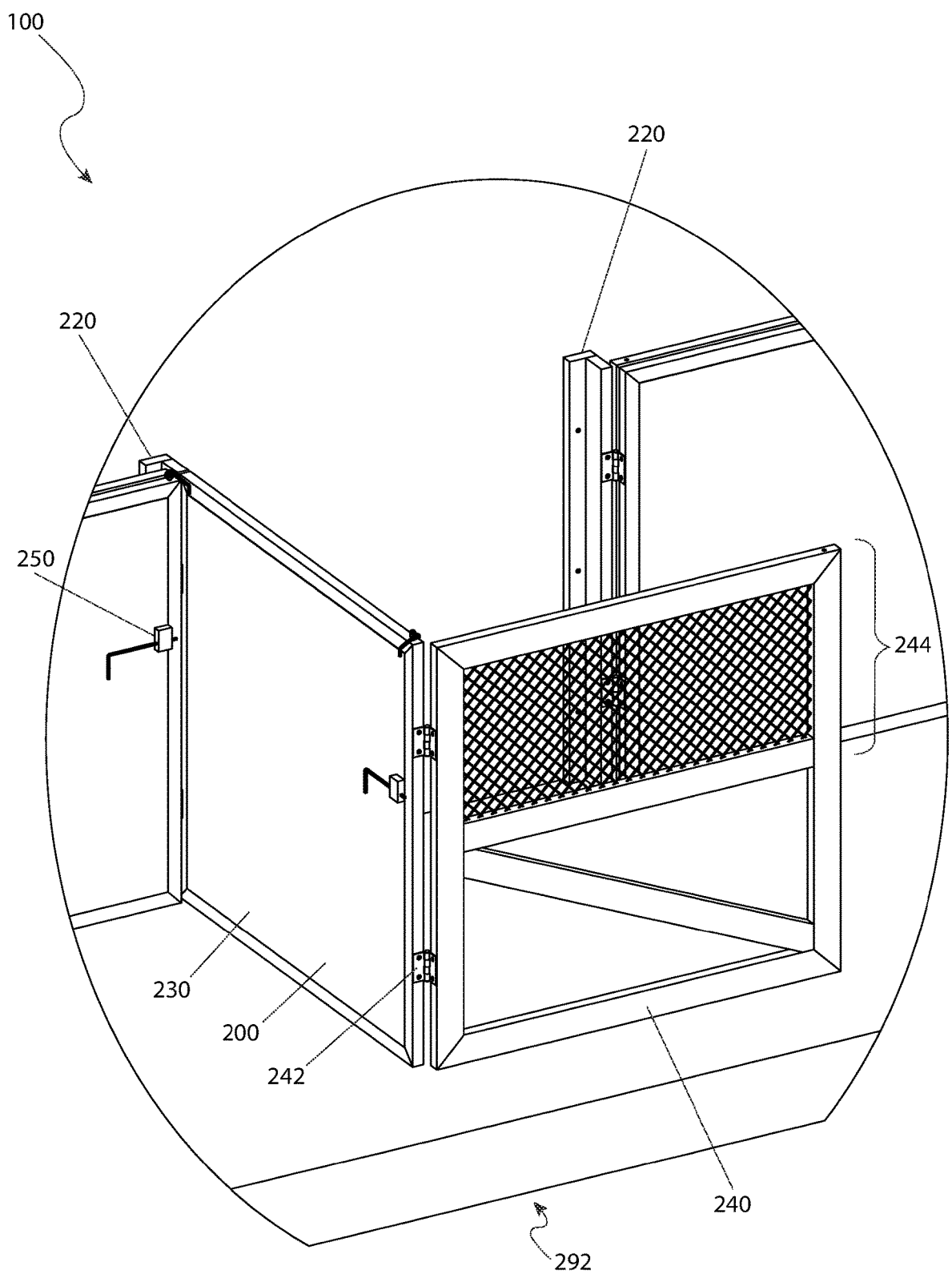
FIG. 3 is an isometric view of a hideaway dog kennel, according to an embodiment of the present invention, illustrating a dog kennel divider in the kennel closed configuration.
Figure 4:
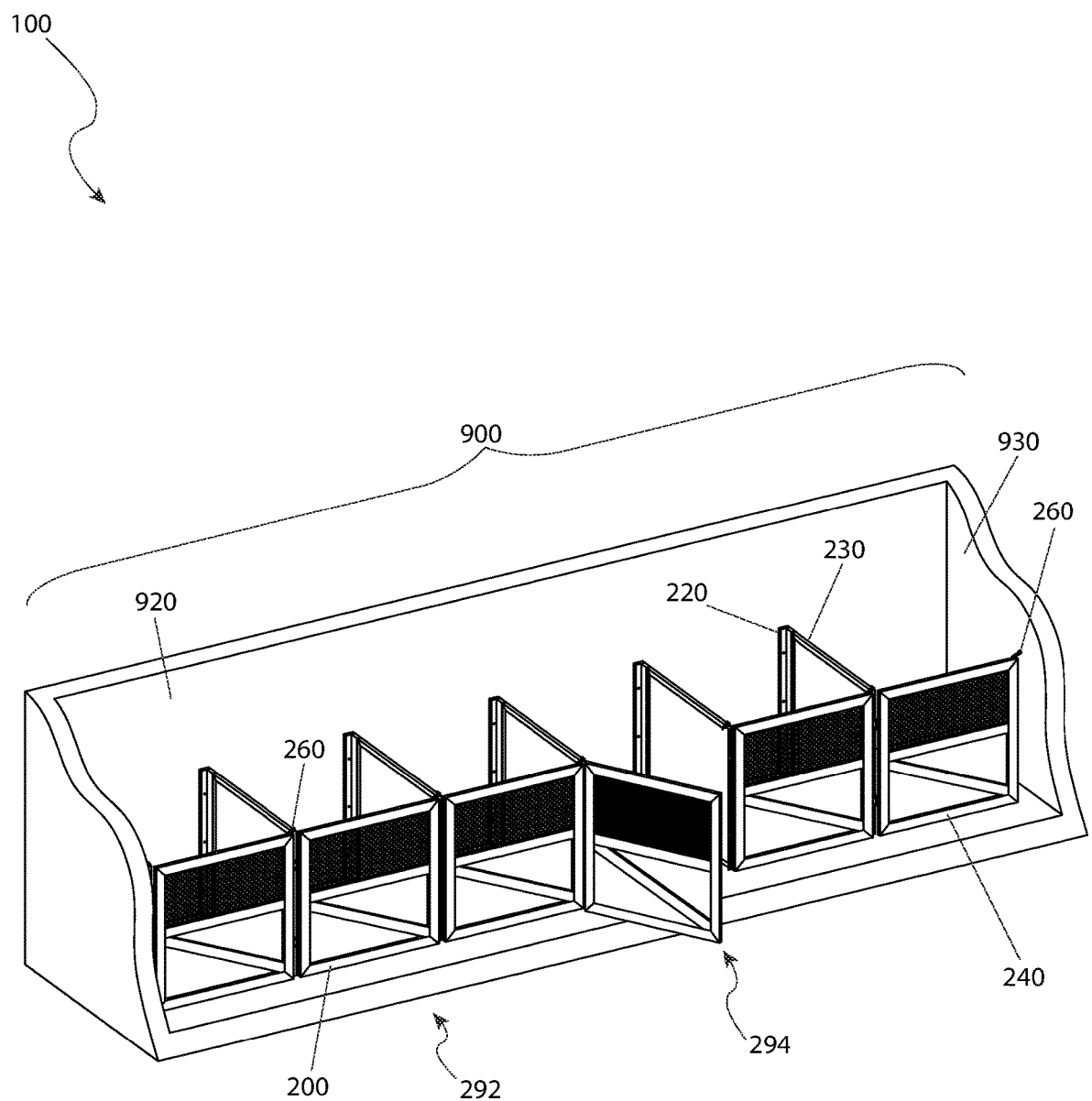
FIG. 4 is an isometric view of a hideaway dog kennel, according to an embodiment of the present invention, illustrating a group of dog kennels formed by the dog kennel dividers.

DESCRIPTIVE KEY 100 hideaway dog kennel
200 dog kennel divider
202 a plurality of dog kennel dividers
204 adjacent dog kennel divider
220 wall mount
230 first divider wall
232 one or more first hinges
240 second divider wall
242 one or more second hinges
244 upper section
250 wall release latch
260 kennel door latch
290 stored configuration
292 kennel closed configuration
294 kennel open configuration
900 group of dog kennels
920 first room wall
930 second room wall

DESCRIPTION OF THE INVENTION

The present invention is directed to a hideaway dog kennel (herein described as the "invention") 100. The invention 100 may comprise a dog kennel divider 200 that may be pivotably coupled to a first room wall 920. The invention 100 may fold flat against the first room wall 920 in a stored configuration 290. The invention 100 may be unfolded to reveal two (2) divider walls of an individual dog kennel. A first divider wall 230 and a second divider wall 240 of the dog kennel divider 200 may comprise a first kennel wall and a second kennel wall of the individual dog kennel. The first room wall 920 may comprise a third kennel wall. A second room wall 930 may comprise a fourth kennel wall. Two (2) or more dog kennel dividers 202 may be installed adjacent to each other to provide a group of dog kennels 900 where the fourth kennel wall may be the second room wall 930 or the first divider wall 230 of an adjacent dog kennel divider 204.

The first divider wall 230 may be wider than the second divider wall 240 such that the second divider wall 240 may pivot to an orientation that placed the second divider wall 240 behind the first divider wall 230 in the stored configuration 290.

The dog kennel divider 200 may comprise a wall mount 220, the first divider wall 230, and the second divider wall 240. The wall mount 220 may be a vertically oriented armature that may couple to the first room wall 920. The first divider wall 230 may pivotably couple to the wall mount 220. The wall mount 220 may separate the first divider wall 230 from the first room wall 920 in order to create space for the second divider wall 240 to reside when the dog kennel divider 200 is in the stored configuration 290 and the first divider wall 230 is parallel to the first room wall 920.

The first divider wall 230 may be a vertically oriented planar structure that may be adapted to constrain movement of one (1) or more dogs. The first divider wall 230 may be pivoted to be parallel to the first room wall 920 in the stored configuration 290 and may be pivoted to be perpendicular to the first room wall 920 during use. A first side of the first divider wall 230 may pivotably couple to the wall mount 220 via one (1) or more first hinges 232. A second side of the first divider wall 230 may pivotably couple to the second divider wall 240.

The second divider wall 240 may be a vertically oriented planar structure that may be adapted to constrain movement of the one (1) or more dogs. The second divider wall 240 may be pivoted to be parallel to the first divider wall 230 in the stored configuration 290 and may be pivoted to be perpendicular to the first divider wall 230 during use. A first side of the second divider wall 240 may pivotably couple to the second end of the second divider wall 240 via one (1) or more second hinges 242. A second side of the second divider wall 240 may couple to the second room wall 930 or to the adjacent dog kennel divider 204.

In a kennel closed configuration 292, the second divider wall 240 may be pivoted to be perpendicular to the first divider wall 230 such that the individual dog kennel is adapted to confine an individual dog within a rectangular area defined by the first kennel wall, the second kennel wall, the third kennel wall, and the fourth kennel wall. The first kennel wall may be the first divider wall 230, the second kennel wall may be the second divider wall 240, the third kennel wall may be the first room wall 920, and the fourth kennel wall may be the second room wall 930 or the first divider wall 230 of the adjacent dog kennel divider 204.

In a kennel open configuration 294, the second divider wall 240 may be pivoted to form an oblique angle with the first divider wall 230 that places the second divider wall 240 outside of the individual dog kennel such that the individual dog kennel is adapted for the individual dog to enter or exit from the individual dog kennel.

In a preferred embodiment, one (1) or more first hinges 232 may be coupled to the left side of the first divider wall 230 and one (1) or more second hinges 242 may be coupled to the left side of the second divider wall 240. The dog kennel divider 200 may pivot from the stored configuration 290 to the kennel open configuration 294 as the first divider wall 230 and the second divider wall 240 both pivot clockwise (as seen from above). In an alternative embodiment, the one (1) or more first hinges 232 may be coupled to the right side of the first divider wall 230 and the one (1) or more second hinges 242 may be coupled to the right side of the second divider wall 240. The dog kennel divider 200 may pivot from the stored configuration 290 to the kennel open configuration 294 as the first divider wall 230 and the second divider wall 240 both pivot counterclockwise (as seen from above).

In some embodiments, an upper section 244 of the second divider wall 240 may provide visibility of the inside of the individual dog kennel, airflow through the upper section 244, or both. As non-limiting examples, the upper section 244 may comprise a screen, grill, wire mesh, a plurality of apertures. In some embodiments, the upper section 244 of the second divider wall 240 may be made from clear plastic.

The dog kennel divider 200 may further comprise a wall release latch 250. The wall release latch 250 may be operable to retain the dog kennel divider 200 in the stored configuration 290 by detachably coupling the first divider wall 230 to the second room wall 930 or to the adjacent dog kennel divider 204. The wall release latch 250 may be engaged to hold the dog kennel divider 200 in the stored configuration 290 and may be disengaged in order to unfold the dog kennel divider 200 for use. As a non-limiting example, the wall release latch 250 may be a sliding bolt.

The dog kennel divider 200 may further comprise a kennel door latch 260. The kennel door latch 260 may be operable to retain the second divider wall 240 in the kennel closed configuration 292 by detachably coupling the second divider wall 240 to the second room wall 930 or to the adjacent dog kennel divider 204. The kennel door latch 260 may be engaged to hold the second divider wall 240 in the stored configuration 290 and may be disengaged in order to pivot the second divider wall 240 to the kennel open configuration 294. As a non-limiting example, the kennel door latch 260 may comprise a kennel door hook coupled to the second divider wall 240 and a kennel door eye screw that coupled to the second room wall 930 or to the adjacent dog kennel divider 204.

The areal size of the individual dog kennel formed by the dog kennel divider 200 may be determined by the width of the first divider wall 230 and the width of the second divider wall 240. The individual dog kennels within the group of dog kennels 900 may comprise different areal sizes. As a non-limiting example, the width of the second divider wall 240 for the dog kennel divider 200 may be wider than the width of the second divider wall 240 for the adjacent dog kennel divider 204.

The count of the individual dog kennels within the group of dog kennels 900 may be varied by adding or removing the dog kennel dividers 200. As a non-limiting example, a user may start with one (1) dog kennel using a single dog kennel divider. The user may expand to a total of four (4) dog kennels by adding three (3) additional dog kennel dividers to the first room wall 920 and those kennels may share a common wall between adjacent kennels. The user may later reduce the number of dog kennels to two by removing two (2) dog kennel dividers from the first room wall 920.

In use, the dog kennel divider 200 may be installed by coupling the wall mount 220 to a first room wall 920 separated from a second room wall 930 by the width of the second divider wall 240. The dog kennel divider 200 may be stored by pivoting the first divider wall 230 and the second divider wall 240 to be parallel to the first room wall 920 and by latching the wall release latch 250 to retain the dog kennel divider 200 in the stored configuration 290.

The individual dog kennel may be deployed for use from the stored configuration 290 to the kennel closed configuration 292 by pivoting the first divider wall 230 to be perpendicular to the first room wall 920, by pivoting the second divider wall 240 to be perpendicular to the first divider wall 230, and by securing the kennel door latch 260.

The individual dog kennel may be transitioned between the kennel closed configuration 292 and the kennel open configuration 294 by coupling and uncoupled the kennel door latch 260 and by pivoting the second divider wall 240 while the kennel door latch 260 is uncoupled.

A group of dog kennels 900 may be installed by coupling two (2) or more dog kennel dividers 202 to the first room wall 920. For each of the dog kennel dividers 200 in the group of dog kennels 900, the kennel door latch 260 may be secured to the adjacent dog kennel divider 204 or to the second room wall 930.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A hideaway dog kennel consisting of:
   a dog kennel divider consisting of:
      a wall mount configured to couple to a first room wall and consisting of a vertically oriented armature;
      a first divider wall pivotably coupled to the wall mount via at least one first hinge, wherein the first divider wall is a vertically oriented planar structure adapted to constrain movement of a dog, and pivots between:
         (a) a stored configuration, where the first divider wall is parallel to the first room wall; and
         (b) a deployed configuration, where the first divider wall is perpendicular to the first room wall;
      a second divider wall pivotably coupled to the first divider wall via at least one second hinge, the second divider wall being narrower than the first divider wall and configured to pivot between:
         (a) a stored configuration, where the second divider wall resides entirely behind the first divider wall; and
         (b) a deployed configuration, where the second divider wall is perpendicular to the first divider wall;
      a wall release latch configured to detachably secure the first divider wall to a second room wall or to a first divider wall of an adjacent dog kennel divider in the stored configuration; and,
      a kennel door latch configured to detachably couple the second divider wall to the second room wall or to the first divider wall of the adjacent dog kennel divider in the deployed configuration; and,
   wherein the wall mount maintains a fixed separation between the first divider wall and the first room wall sufficient to allow the second divider wall to reside fully between the first divider wall and the first room wall when in the stored configuration;
   wherein, in the deployed configuration, the first divider wall, second divider wall, first room wall, and second room wall or adjacent first divider wall together define a fully enclosed rectangular kennel space; and,
   wherein the kennel door latch is further configured to permit selective access by allowing the second divider wall to pivot outward to form an oblique angle relative to the first divider wall for ingress or egress by the dog.

\* \* \* \* \*